United States Patent

Hulitt et al.

(10) Patent No.: US 9,884,604 B2
(45) Date of Patent: Feb. 6, 2018

(54) CHILD SAFETY HARNESS ASSEMBLY

(71) Applicants: Brooks Hulitt, Philadelphia, PA (US); Zeb Congdon, Philadelphia, PA (US)

(72) Inventors: Brooks Hulitt, Philadelphia, PA (US); Zeb Congdon, Philadelphia, PA (US)

( * ) Notice: Subject to any disclaimer, the term of this patent is extended or adjusted under 35 U.S.C. 154(b) by 60 days.

(21) Appl. No.: 15/052,840

(22) Filed: Feb. 24, 2016

(65) Prior Publication Data

US 2017/0240134 A1  Aug. 24, 2017

(51) Int. Cl.
  *B60R 22/02* (2006.01)
  *B60R 22/10* (2006.01)
  *B60R 22/12* (2006.01)
  *A44B 11/25* (2006.01)
  *B60R 22/30* (2006.01)

(52) U.S. Cl.
  CPC .......... *B60R 22/12* (2013.01); *A44B 11/2503* (2013.01); *B60R 22/024* (2013.01); *B60R 22/105* (2013.01); *B60R 22/30* (2013.01)

(58) Field of Classification Search
  CPC ..... B60R 22/024; B60R 22/105; B60R 22/12; B60R 22/30; B60R 22/26; B60R 2022/027; A47D 15/006; B64D 25/06
  USPC .................................. 297/484, 485; 280/808
  See application file for complete search history.

(56) References Cited

U.S. PATENT DOCUMENTS

| | | | | |
|---|---|---|---|---|
| 4,099,770 A | * | 7/1978 | Elsholz | B60N 2/2809 297/216.11 |
| 4,226,474 A | * | 10/1980 | Rupert | A47D 15/006 297/465 |
| 4,231,616 A | * | 11/1980 | Painter | B64D 25/06 280/808 |
| 4,396,228 A | * | 8/1983 | Go | B60R 22/02 244/122 B |
| 4,927,211 A | | 5/1990 | Bolcerek | |
| 5,649,744 A | * | 7/1997 | Apodaca | B60R 22/02 297/484 |
| 6,364,417 B1 | | 4/2002 | Silverman | |
| 6,820,902 B2 | | 11/2004 | Kim | |
| D641,524 S | | 7/2011 | Graham et al. | |
| 8,210,617 B2 | | 7/2012 | Aaron et al. | |
| 2003/0173817 A1 | * | 9/2003 | Vits | B60N 2/265 297/484 |
| 2004/0169411 A1 | * | 9/2004 | Murray | B60R 22/105 297/486 |

(Continued)

FOREIGN PATENT DOCUMENTS

DE 2617801 A1 * 10/1977 ............. B60R 22/02
EP 0646502  9/1994

*Primary Examiner* — Ryan D Kwiecinski

(57) ABSTRACT

A child safety harness assembly for securing a child in a vehicle includes a first strap that has a midsection. The midsection is curved, such that opposing side sections of the strap extend in substantial parallelism from the midsection. Each of a pair of second straps is coupled to and extends between the opposing side sections. The second straps are substantially evenly spaced between the midsection and opposing ends of the first strap. A third strap has a first endpoint that is coupled to the midsection equally distant from the opposing ends of the first strap. Each of a set of three couplers is coupled singly to the opposing ends and the third strap. The second straps and the third strap are length adjustable. The couplers are configured to couple to anchors of the vehicle to couple the child to the vehicle.

9 Claims, 5 Drawing Sheets

(56) References Cited

U.S. PATENT DOCUMENTS

| | | | |
|---|---|---|---|
| 2006/0290192 A1* | 12/2006 | DeLellis | B60R 22/02 297/469 |
| 2007/0001495 A1* | 1/2007 | Boyle | B60N 2/2806 297/253 |
| 2007/0069568 A1* | 3/2007 | Kuo | B60R 22/105 297/468 |
| 2013/0249204 A1* | 9/2013 | Fink | B60R 22/024 280/801.1 |
| 2014/0139005 A1 | 5/2014 | Rouhana | |

* cited by examiner

CHILD SAFETY HARNESS ASSEMBLY

BACKGROUND OF THE DISCLOSURE

Field of the Disclosure

The disclosure relates to harness assemblies and more particularly pertains to a new harness assembly for securing a child in a vehicle.

SUMMARY OF THE DISCLOSURE

An embodiment of the disclosure meets the needs presented above by generally comprising a first strap that has a midsection. The midsection is curved, such that opposing side sections of the strap extend in substantial parallelism from the midsection. Each of a pair of second straps is coupled to and extends between the opposing side sections. The second straps are substantially evenly spaced between the midsection and opposing ends of the first strap. A third strap has a first endpoint that is coupled to the midsection equally distant from the opposing ends of the first strap. Each of a set of three couplers is coupled singly to the opposing ends and the third strap. The second straps and the third strap are length adjustable. The couplers are configured to couple to anchors of the vehicle to couple the child to the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
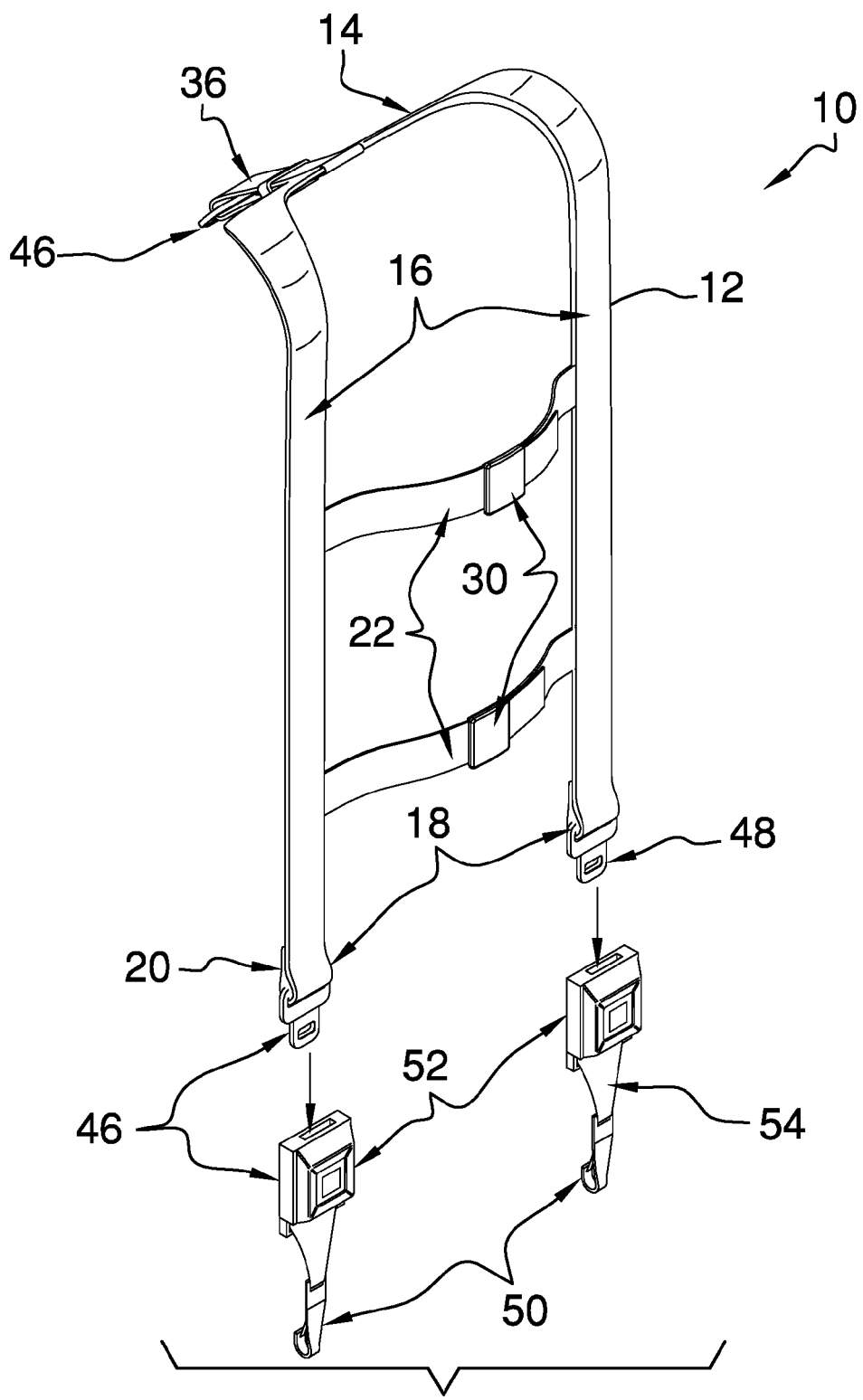
FIG. 1 is an isometric perspective view of a child safety harness assembly according to an embodiment of the disclosure.
Figure 2:
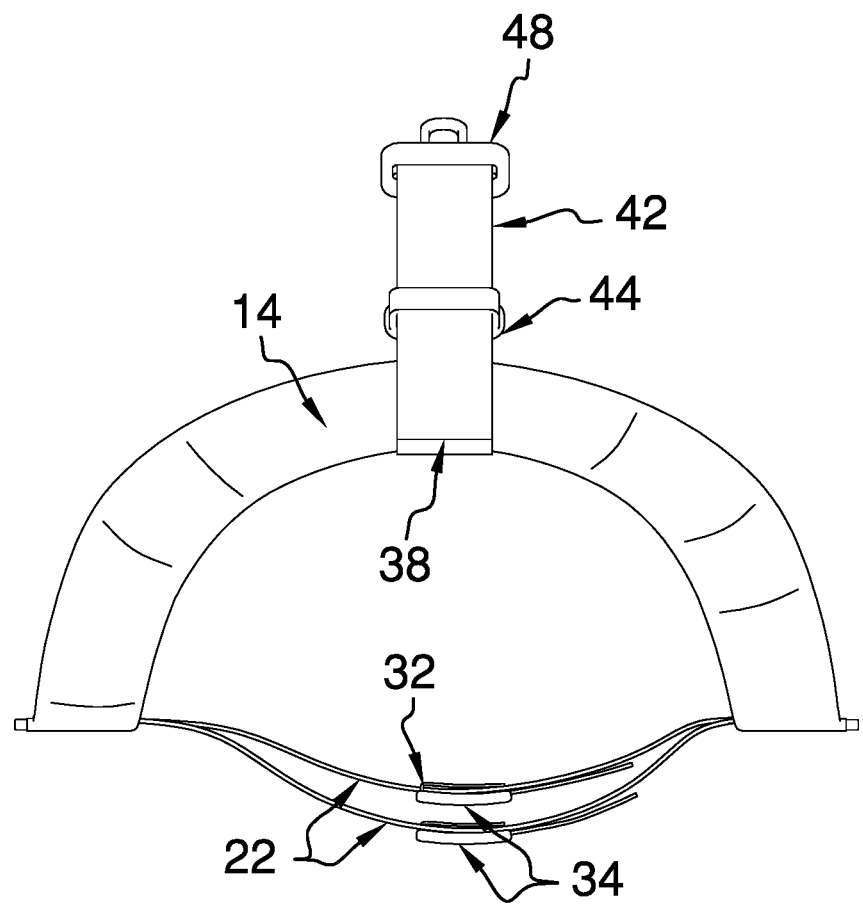
FIG. 2 is a top view of an embodiment of the disclosure.
Figure 3:
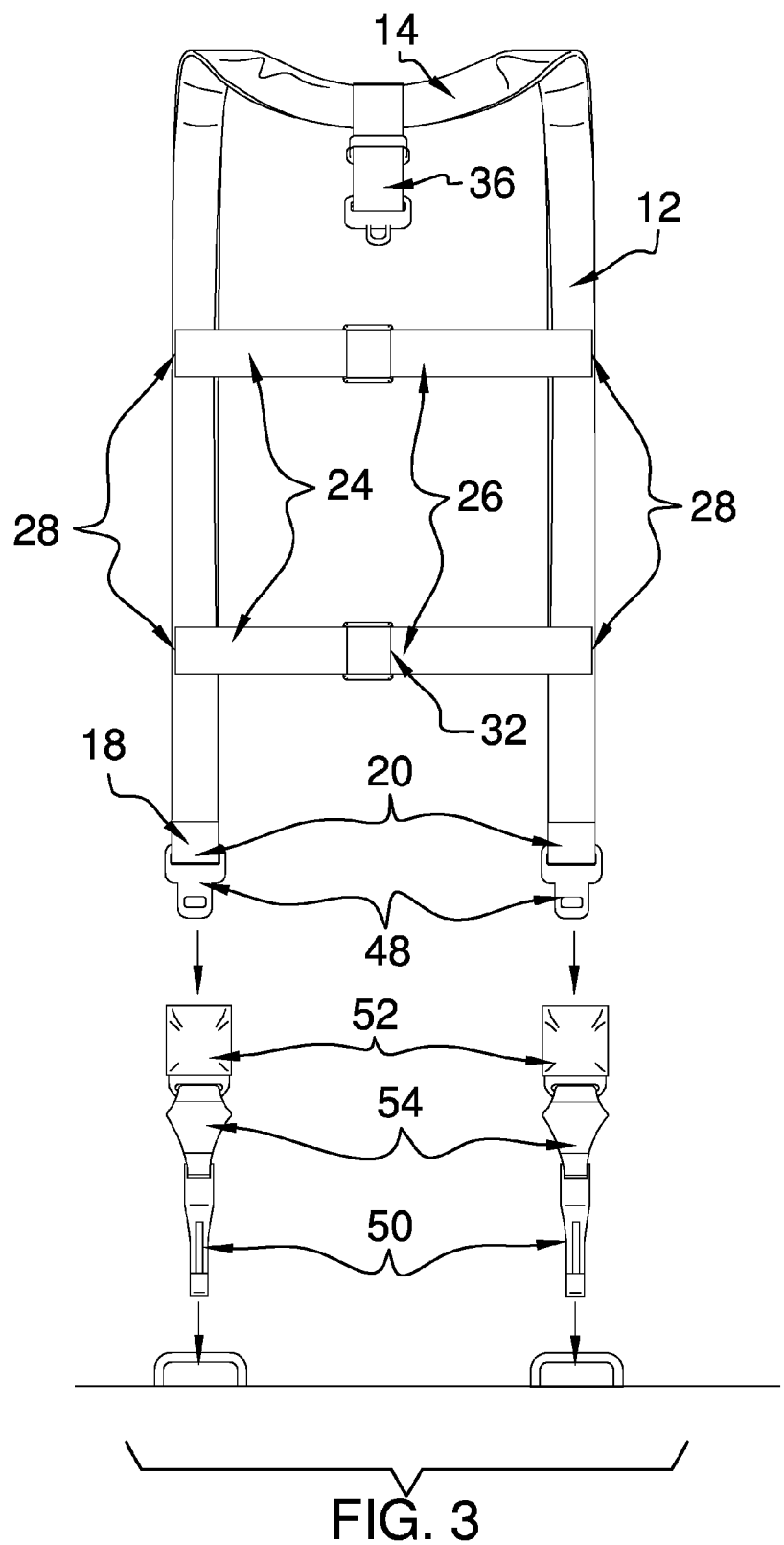
FIG. 3 is a back view of an embodiment of the disclosure.
Figure 4:
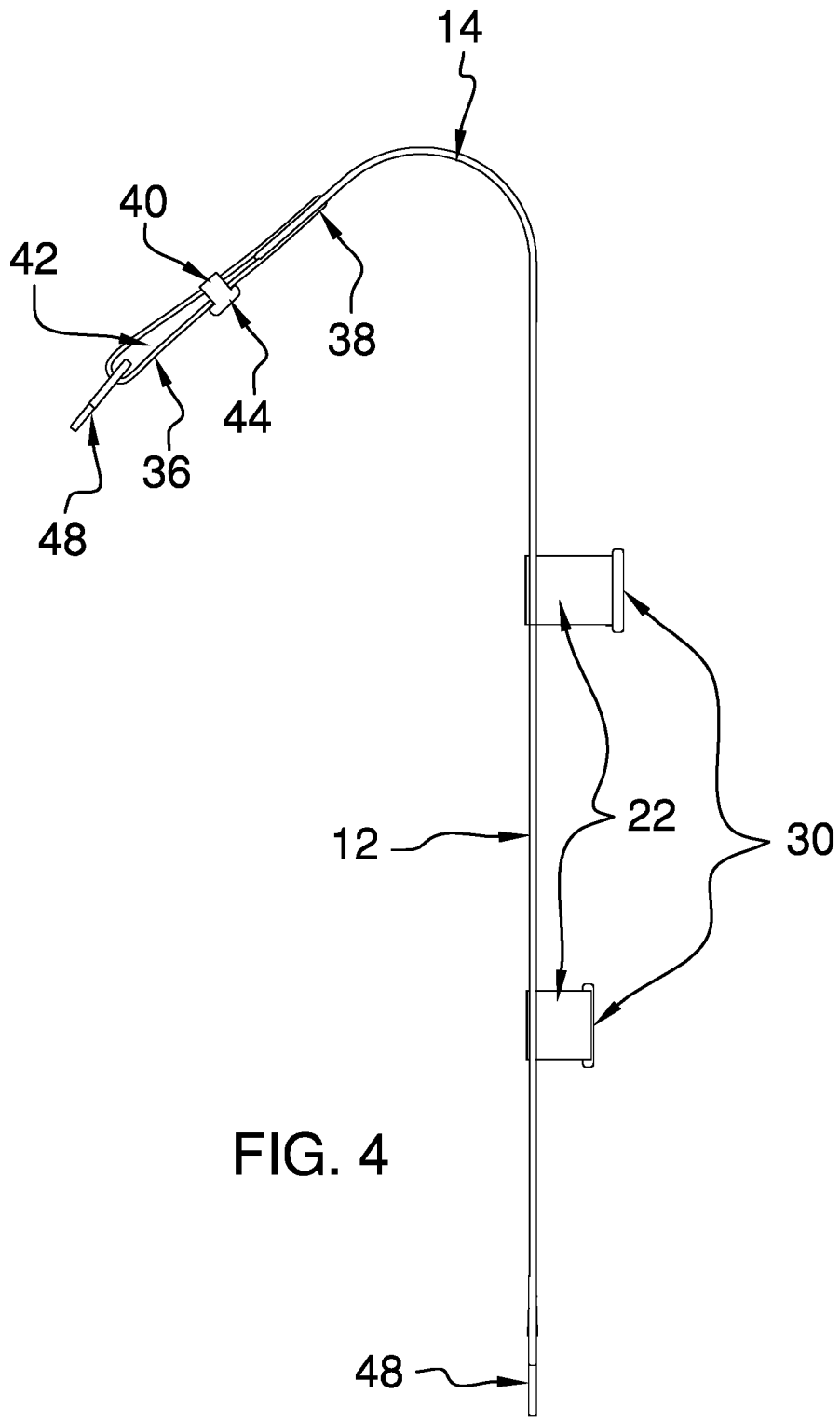
FIG. 4 is a side view of an embodiment of the disclosure.
Figure 5:
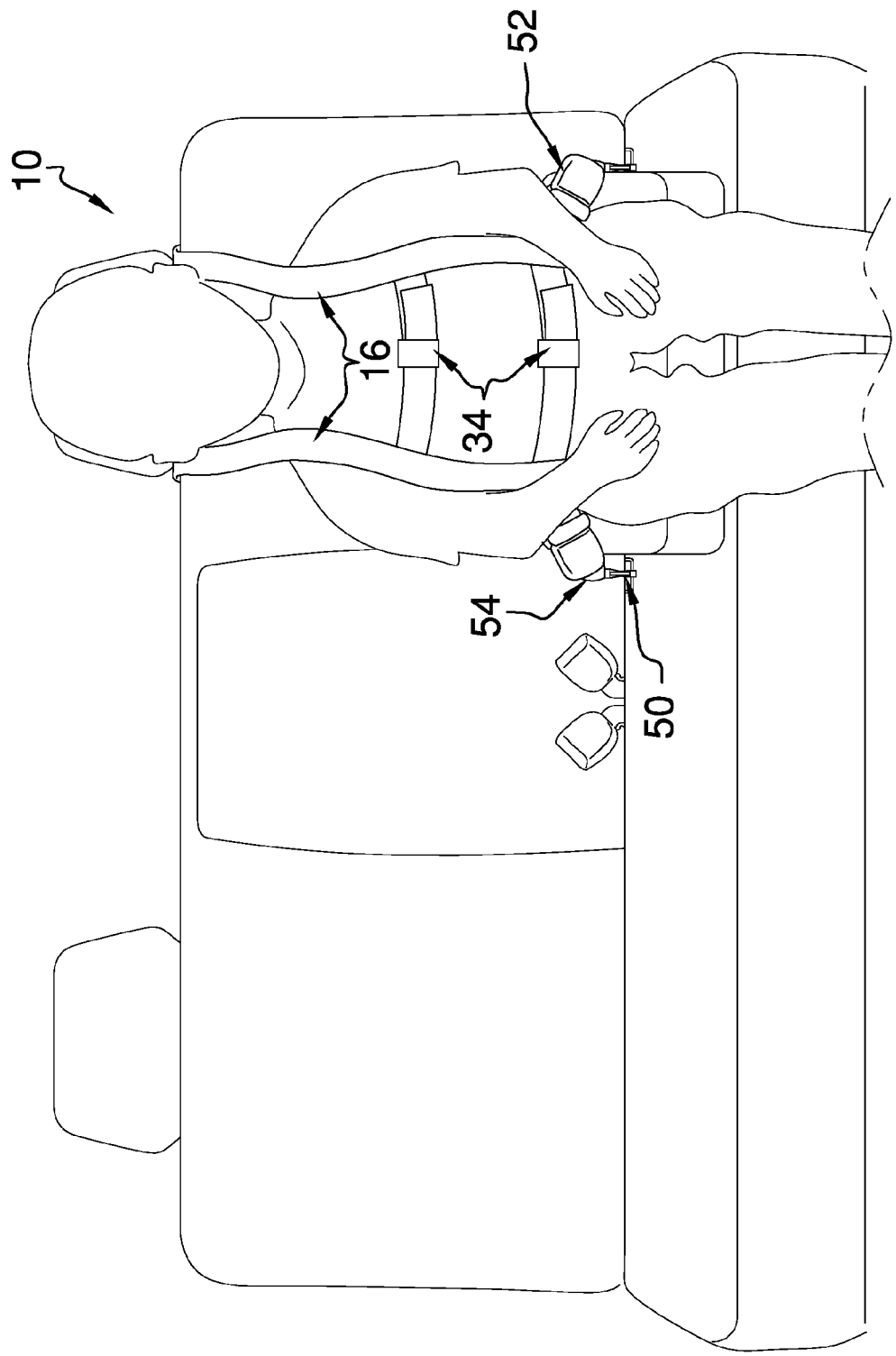
FIG. 5 is an in-use view of an embodiment of the disclosure.

With reference now to the drawings, and in particular to FIGS. 1 through 5 thereof, a new harness assembly embodying the principles and concepts of an embodiment of the disclosure and generally designated by the reference numeral 10 will be described.

As best illustrated in FIGS. 1 through 5, the child safety harness assembly 10 generally comprises a first strap 12 that has a midsection 14. The midsection 14 is curved, such that opposing side sections 16 of the first strap 12 extend in substantial parallelism from the midsection 14. Each of opposing ends 18 of the first strap 12 is stitchedly coupled to the first strap 12 proximate to the respective opposing end 18, defining a first loop 20.

Each of a pair of second straps 22 is coupled to and extends between the opposing side sections 16. The second straps 22 are length adjustable. The second straps 22 are substantially evenly spaced between the midsection 14 and the opposing ends 18 of the first strap 12. More specifically, each second strap 22 comprises a first strip 24 and a second strip 26, which each have a first end 28. Each first end 28 is coupled to a respective opposing side section 16. A first fastener 30 is coupled to a second end 32 of the second strip 26. The first fastener 30 is slidably couplable to the first strip 24. Preferably, the first fastener 30 comprises a first buckle 34. The first fastener 30 is positioned to couple to the first strip 24, such that a respective second strap 22 is adjustably securable around the child.

A third strap 36, which is length adjustable, has a first endpoint 38. The first endpoint 38 is coupled to the midsection 14 equally distant from the opposing ends 18 of the first strap 12. A second fastener 40 is coupled to the third strap 36 proximate to the first endpoint 38. The third strap 36 is couplable to the second fastener 40 to form a second loop 42. The second fastener 40 is positioned to couple to the third strap 36 such that the second loop 42 is adjustably sizeable. Preferably, the second fastener 40 comprises a second buckle 44.

Each of a set of three couplers 46 is coupled singly to the opposing ends 18 of the first strap 12 and to the third strap 36. More specifically, each coupler 46 comprises a male seat belt connector 48, a latch 50, a female seat belt connector 52, and, preferably, a fourth strap 54. The male seat belt connectors 48 are coupled singly to the opposing ends 18 of the first strap 12 and to the third strap 36. The latch 50 is configured to couple to anchors of the vehicle. The female seat belt connector 52 is coupled to the latch 50. Preferably, the fourth strap 54 is coupled to and extends between the latch 50 and the female seat belt connector 52. Also preferably, the male seat belt connectors 48 are coupled singly to each first loop 20 and the second loop 42.

In use, the latches 50 are configured to couple to the anchors of the vehicle such that the female seat belt connectors 52 are positioned to couple with the male seat belt connectors 48 to couple the assembly 10 to the vehicle. The midsection 14 is configured to place over the shoulders and behind the head of a child. The second loop 42 is sizably adjusted using the second buckle 44. One of the second straps 22 is configured to adjustably position across the chest of the child. The other of the second straps 22 is configured to adjustably position across the lap of the child.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A child safety harness assembly comprising:
   a first strap, said first strap having a midsection, said midsection being curved, such that opposing side sections of said first strap extend in substantial parallelism from said midsection;
   a pair of second straps, each said second strap being coupled to and extending between said opposing side sections, said second straps being length adjustable, said second straps being substantially evenly spaced between said midsection and opposing ends of said first strap;
   a third strap, said third strap being length adjustable, said third strap having a first endpoint, said first endpoint being coupled to said midsection equally distant from said opposing ends of said first strap;
   a set of three couplers, said couplers being coupled singly to said opposing ends and said third strap, each said coupler comprising
      a male seat belt connector, wherein said male seat belt connectors are coupled singly to said opposing ends and said third strap,
      a latch, said latch being configured to couple to anchors of the vehicle, and
      a female seat belt connector, said female seat belt connector being coupled to said latch;
   wherein said midsection is configured to place over the shoulders and behind the head of a child, one of said second straps across the chest and the other of said second straps the lap, such that said couplers are configured to couple to anchors of a vehicle to couple the child to the vehicle.

2. The assembly of claim 1, further including each said opposing end being stitchedly coupled to said first strap proximate to said respective said opposing end, defining a first loop.

3. The assembly of claim 1, further including each said second strap comprising:
   a first strip and a second strip each having a first end, each said first end being coupled to a respective said opposing side section,
   a first fastener, said first fastener being coupled to a second end of said second strip, said first fastener being slidably couplable to said first strip, and
   wherein said first fastener is coupled to said second strip such that said first fastener is positioned to couple to said first strip such that a respective second strap is adjustably securable around the child.

4. The assembly of claim 3, further including said first fastener comprising a first buckle.

5. The assembly of claim 1, further including a second fastener, said second fastener being coupled to said third strap proximate to said first endpoint, said third strap being couplable to said second fastener to form a second loop, wherein said second fastener is positioned to couple to said third strap such that said second loop is adjustably sizeable.

6. The assembly of claim 5, further including said second fastener comprising a second buckle.

7. The assembly of claim 1, further including each said coupler comprising a fourth strap, said fourth strap being coupled to and extending between said latch and said female seat belt connector.

8. The assembly of claim 1, further including said male seat belt connectors being coupled singly to each said first loop and said second loop.

9. A child safety harness assembly comprising:
   a first strap, said first strap having a midsection, said midsection being curved, such that opposing side sections of said first strap extend in substantial parallelism from said midsection, said first strap having opposing ends, each said opposing end being stitchedly coupled to said first strap proximate to said respective said opposing end, defining a first loop;
   a pair of second straps, each said second strap being coupled to and extending between said opposing side sections, said second straps being length adjustable, said second straps being substantially evenly spaced between said midsection and opposing ends of said first strap, each said second strap comprising:
      a first strip and a second strip each having a first end, each said first end being coupled to a respective said opposing side section,
      a first fastener, said first fastener being coupled to a second end of said second strip, said first fastener being slidably couplable to said first strip, said first fastener comprising a first buckle, and
      wherein said first fastener is coupled to said second strip such that said first fastener is positioned to couple to said first strip such that a respective second strap is adjustably securable around the child;
   a third strap, said third strap being length adjustable, said third strap having a first endpoint, said first endpoint being coupled to said midsection equally distant from said opposing ends of said first strap;
   a second fastener, said second fastener being coupled to said third strap proximate to said first endpoint, said third strap being couplable to said second fastener to form a second loop, wherein said second fastener is positioned to couple to said third strap such that said second loop is adjustably sizeable, said second fastener comprising a second buckle;
   a set of three couplers, said couplers being coupled singly to said opposing ends and said third strap;
   each said coupler comprising:
      a male seat belt connector, wherein said male seat belt connectors are coupled singly to said opposing ends and said third strap,
      a latch, said latch being configured to couple to anchors of the vehicle,
      a female seat belt connector, said female seat belt connector being coupled to said latch, and
      a fourth strap, said fourth strap being coupled to and extending between said latch and said female seat belt connector;
   said male seat belt connectors being coupled singly to each said first loop and said second loop; and
   wherein said latches are configured to couple to the anchors of the vehicle such that said female seat belt connectors are positioned to couple with said male seat belt connectors to couple the assembly to the vehicle, and wherein said midsection is configured to place over the shoulders and behind the head of a child and said second loop sizably adjusted using said second buckle, and wherein one of said second straps is configured to adjustably position across the chest of the child and the other of said second straps is configured to adjustably position across the lap of the child to couple the child to the vehicle.

* * * * *